United States Patent [19]

Umezu

[11] Patent Number: 4,813,474

[45] Date of Patent: Mar. 21, 1989

[54] AIR CONDITIONER APPARATUS WITH IMPROVED DEHUMIDIFICATION CONTROL

[75] Inventor: Kenji Umezu, Shizuoka, Japan

[73] Assignee: Kabushiki Kaisha Toshiba, Kawasaki, Japan

[21] Appl. No.: 130,322

[22] Filed: Dec. 8, 1987

[30] Foreign Application Priority Data

Dec. 26, 1986 [JP] Japan .................. 61-308628

[51] Int. Cl.$^4$ ............................................. F24F 3/14
[52] U.S. Cl. ............................................ 165/21; 62/90; 62/176.5
[58] Field of Search ............. 62/176.5, 90, 173, 228.4; 165/21

[56] References Cited

U.S. PATENT DOCUMENTS

| 3,520,147 | 7/1970 | Glackman | 62/176.5 X |
| 3,831,663 | 8/1974 | Pithie | 62/90 X |
| 4,189,929 | 2/1980 | Russell | 62/176.5 |
| 4,720,982 | 1/1988 | Shimizu et al. | 62/228.4 X |

FOREIGN PATENT DOCUMENTS

| 47-11949 | 10/1972 | Japan . |
| 54-125152 | 9/1979 | Japan . |
| 55-163637 | 11/1980 | Japan . |

Primary Examiner—William E. Wayner
Attorney, Agent, or Firm—Cushman, Darby & Cushman

[57] ABSTRACT

A refrigeration cycle includes at least a variable-capacity compressor, an outdoor heat exchanger, an evacuation device, and an indoor heat exchanger, all of which communicate with each other. A reheater is arranged in association with the indoor heat exchanger. A temperature setting unit sets a desired indoor temperature. A humidity setting unit sets a desired indoor humidity. A temperature detecting unit detects an indoor temperature. A humidity detecting unit detects an indoor humidity. A controller outputs first control data for controlling capacity of the variable-capacity compressor by comparing temperature data preset by the indoor temperature setting unit with temperature data detected by the temperature detecting unit so as to set a difference between both temperature data to be zero, and at the same time outputs second control data for controlling a heating power of the reheater by comparing humidity data preset by the humidity setting unit with humidity data detected by the humidity detecting unit so as to set a difference between both humidity data to be zero. The first and second control data are generated at substantially the same time, thereby quickly and smoothly providing the desired indoor temperature and humidity.

11 Claims, 6 Drawing Sheets

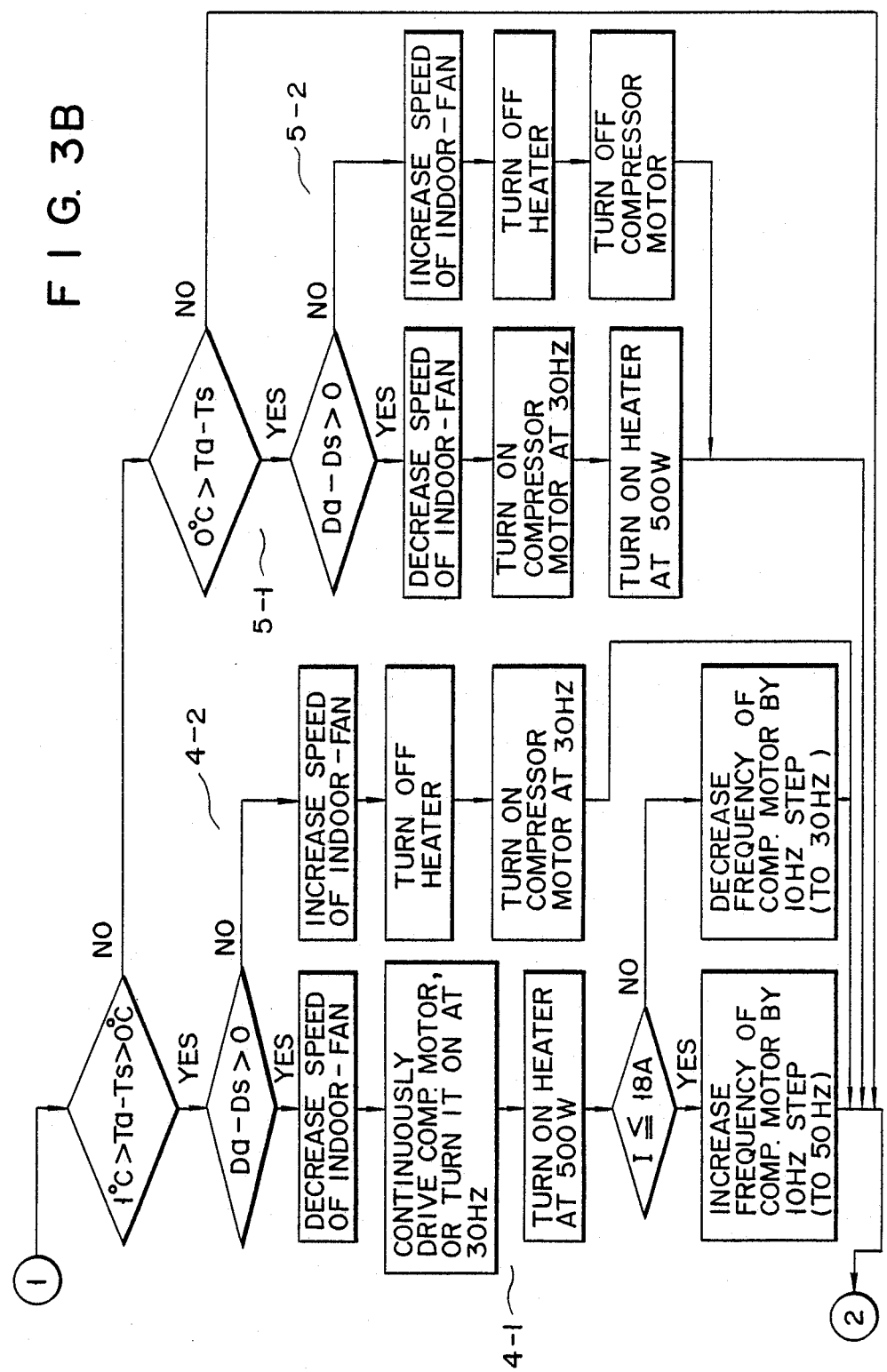

AIR CONDITIONER APPARATUS WITH IMPROVED DEHUMIDIFICATION CONTROL

BACKGROUND OF THE INVENTION

This invention relates to an air conditioner apparatus and, more particularly, to an air conditioner apparatus with a dehumidification operation function.

In a conventional air conditioner apparatus, a heat pump type refrigeration cycle is used to perform a cooling operation (and heating operation).

In an air conditioner apparatus of this type, a reheater is arranged near an indoor heat exchanger to perform a dehumidification (drying) operation, wherein air which is cooled and dehumidified by the indoor heat exchanger is heated by the reheater, thereby blowing dehumidified air into a room.

However, since such cooling and dehumidification (drying) operations are independently operated, it is difficult to obtain comfortable room conditions satisfactory in both temperature and humidity.

More specifically, since the dehumidification operation is started after a room temperature is decreased by the cooling operation, a long period of time is required for obtaining desired temperature and humidity conditions. Therefore, a user feels uncomfortable during the operation.

SUMMARY OF THE INVENTION

It is, therefore, an object of the present invention to provide a new and improved air conditioner apparatus which can always set optimal indoor temperature and humidity in a smooth and quick manner, thereby greatly increasing the comfort of the user.

According to the present invention, there is provided an air conditioner apparatus comprising:

a refrigeration cycle including at least a variable-capacity compressor, an outdoor heat exchanger, an evacuation device, and an indoor heat exchanger, all of which communicate with each other;

a reheater arranged in association with the indoor heat exchanger;

temperature setting means for setting a desired indoor temperature;

humidity setting means for setting a desired indoor humidity;

temperature detecting means for detecting an indoor temperature;

humidity detecting means for detecting an indoor humidity; and control means for outputting first control data for controlling a capacity of the variable-capacity compressor by comparing temperature data preset by the indoor temperature setting means with temperature data detected by the temperature detecting means so as to set a difference between both the temperature data to be zero, and at the same time outputting second control data for controlling a heating power of the reheater by comparing humidity data preset by the humidity setting means with humidity data detected by the humidity detecting means so as to set a difference between both the humidity data to be zero, the first and second control data being generated at substantially the same time, thereby quickly and smoothly providing the desired indoor temperature and humidity.

BRIEF DESCRIPTION OF THE DRAWINGS

These and other objects and features of the present invention can be understood through the following embodiment by reference to the accompanying drawings, in which:

FIGS. 3A-1, 3A-2, and 3B are flow charts for explaining an operation of the embodiment.

DETAILED DESCRIPTION OF THE PREFERRED EMBODIMENT

An embodiment of the present invention will be described with reference to the accompanying drawings hereinafter.

Figure 1:
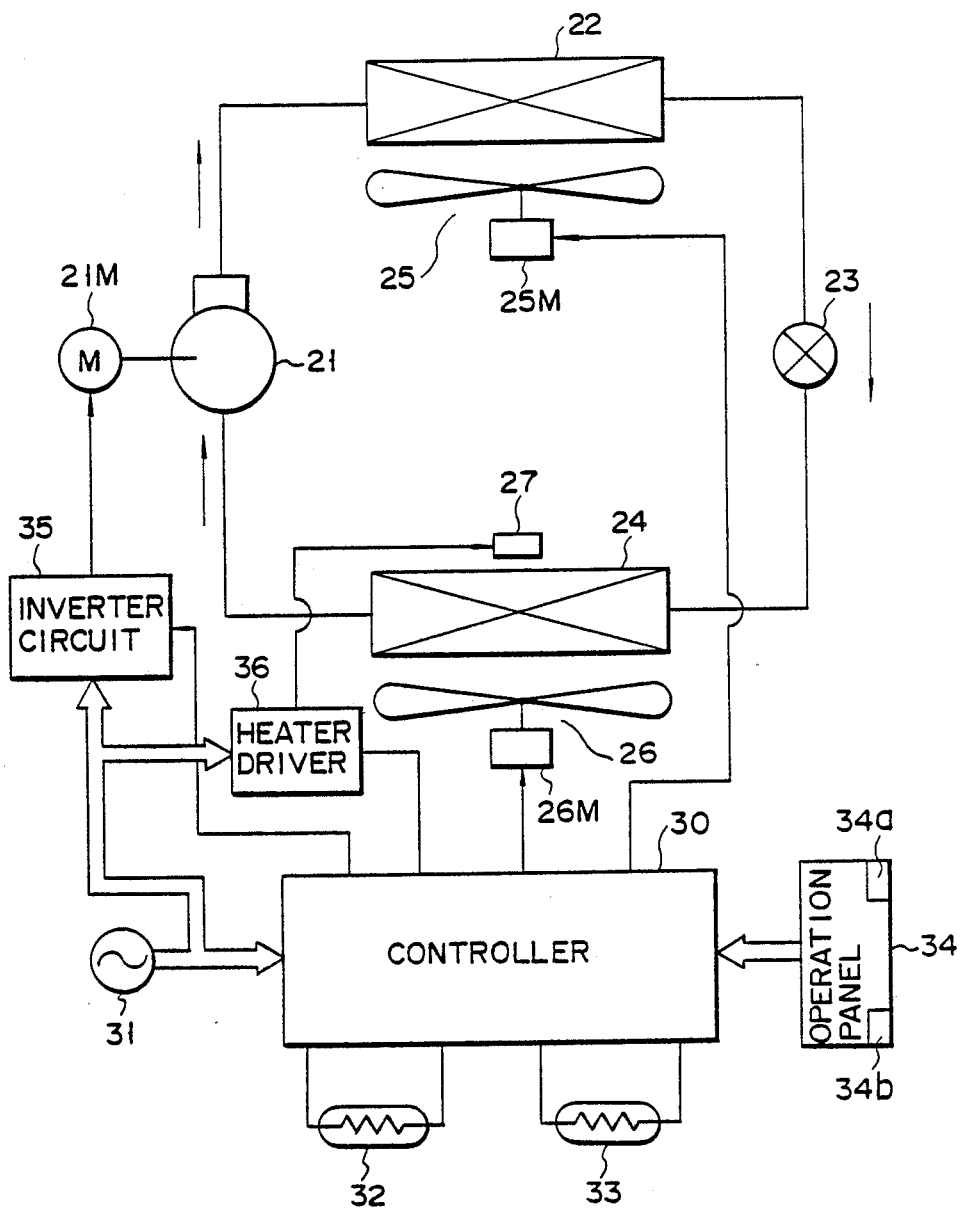
FIG. 1 is a view showing an arrangement according to an embodiment of the present invention.

Referring to FIG. 1, reference numeral 21 denotes a variable-capacity compressor, with which an evacuation device, e.g., expansion valve 23, indoor heat exchanger 24, and the like sequentially communicate, thereby constituting a heat pump type refrigeration cycle. Outdoor-fan 25 is arranged near outdoor heat exchanger 22, and indoor-fan 26 and electric heater (to be referred to as a reheater hereinafter) 27 serving as a reheater are arranged near indoor heat exchanger 24.

Reference numeral 30 denotes a controller for controlling the entire air conditioner apparatus. Controller 30 comprises a microcomputer, its peripheral circuits, and the like, and is connected to commercial AC power source 31. Outdoor-fan motor 25M, indoor-fan motor 26M, and reheater 27 are connected to controller 30, while indoor temperature sensor 32, indoor humidity sensor 33, operation panel 34, inverter circuit 35, and heater driver 36 are connected to controller 30. Inverter circuit 35 connected to power source 31 rectifies commercial AC power source voltage, then converts the voltage into an AC voltage having a predetermined frequency corresponding to a command from controller 30, and supplies the converted voltage to drive motor 21M of compressor 21. Heater driver 36 is arranged between power source 31 and reheater 27. Heater driver 36 has a function of controlling heating energy of the reheater through thyristor control in accordance with a command from controller 30. Note that in the above-described arrangement, operation panel 34 includes at least temperature and humidity setting members 34a and 34b for setting indoor temperature and humidity. Remote control unit 45, which is later described, has the same arrangement as that of operation panel 34.

Figure 2:
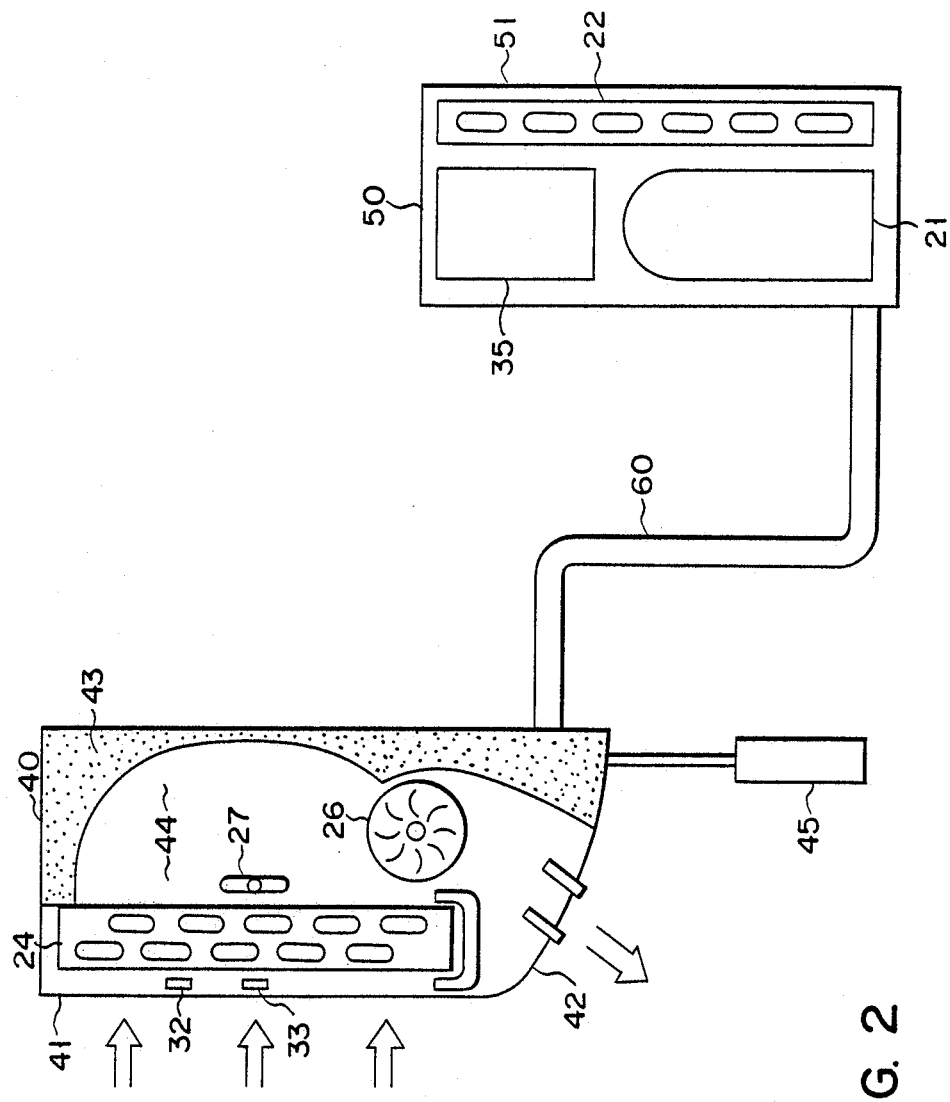
FIG. 2 is a view showing an arrangement of an indoor unit and an outdoor unit according to the embodiment.
Figures 1, 3A:
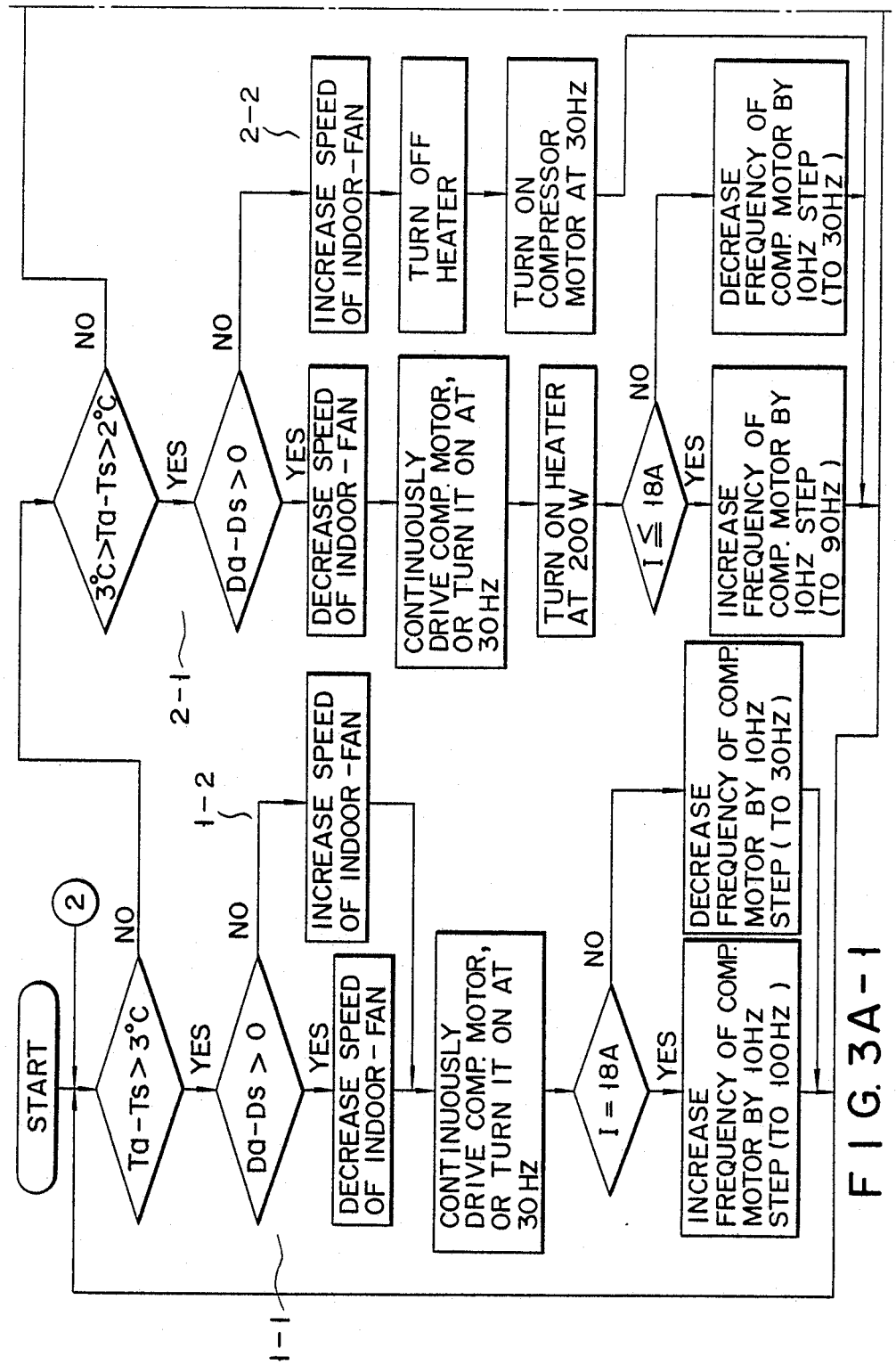
Figures 2, 3A:
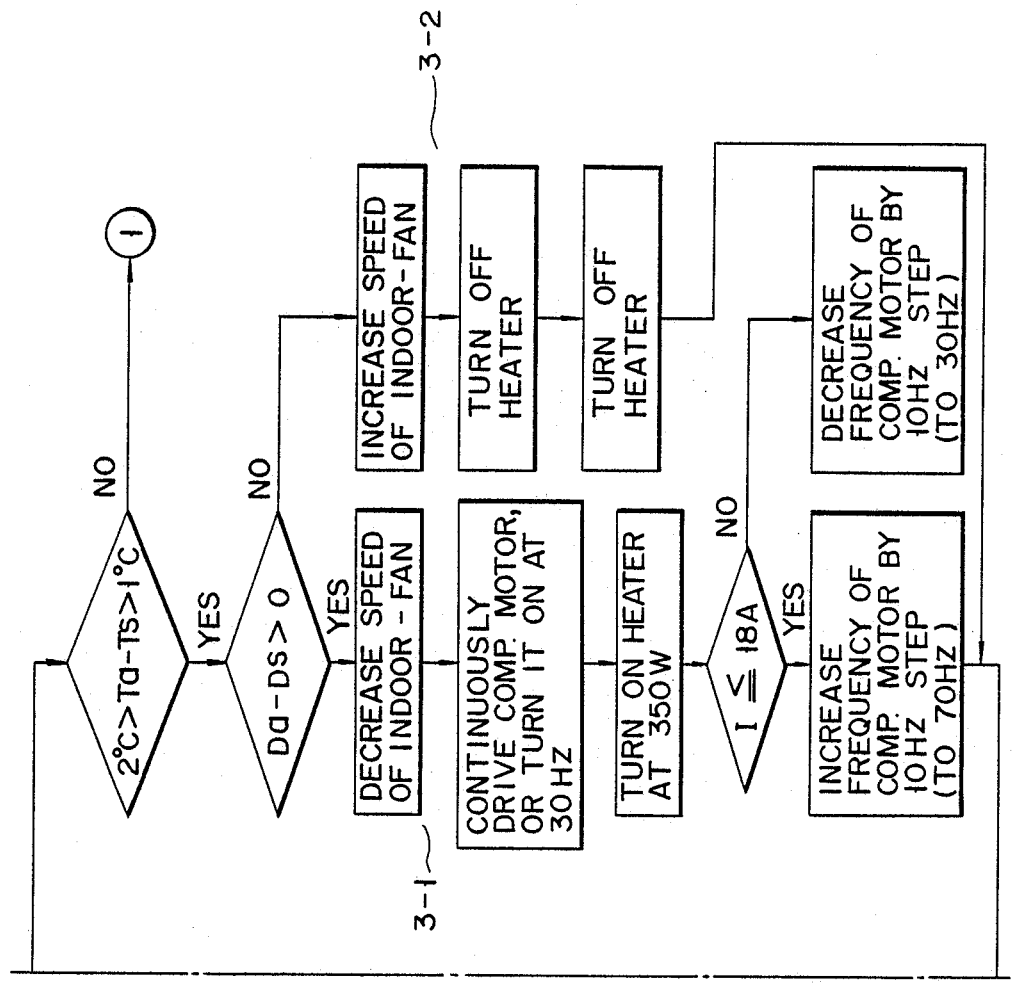

If FIG. 2, reference numeral 40 denotes an indoor unit; and 50, an outdoor unit. They are connected to each other through pipes/cables 60 consisting of refrigerant pipes and connecting cables.

Air intake port 41 is formed in a front surface of indoor unit 40, and air delivery port 42 is formed in a lower portion thereof. Air duct 44 of heat-insulating material 43 is formed from air intake port 41 to air delivery port 42. In air duct 44, indoor heat exchanger 24 is arranged near air intake port 41, and reheater 27 and indoor-fan 26 are arranged in the downstream of indoor heat exchanger 24. In indoor unit 40, indoor temperature sensor 32 and indoor humidity sensor 33 are arranged between air intake port 41 and indoor heat exchanger 24. Remote control unit 45 is connected to the lower portion of indoor unit 40 through a cable.

Outdoor unit 50 includes openings 51, and outdoor heat exchanger 22 is arranged inside openings 51. In addition, compressor 21 and inverter circuit 35 are arranged inside outdoor unit 50.

The operation of the air conditioner apparatus having the above-described arrangement will be described with reference to a series of flow charts of FIGS. 3A-1, 3A-2, and 3B.

Desired temperature Ts and desired humidity (relative humidity) H are set using temperature setting member 34a and humidity setting member 34b of operation panel 34 or remote control unit 45, and then the operation is started using a start switch (not shown). Subsequently, controller 30 drives inverter circuit 35 to start compressor 21, while starting operating outdoor-fan 25 and indoor-fan 26. When compressor 21 is turned on, a refrigerant flows in a direction indicated by arrows in FIG. 1, thereby forming a cooling cycle. Accordingly, indoor air is taken into indoor unit 40 through air intake port 41, cooled (and dehumidified) by indoor heat exchanger 24, and then delivered into a room through air delivery port 42. Thus, the cooling operation is started.

During the cooling operation, controller 30 calculates a difference between detected temperature Ta from indoor temperature sensor 32 and preset temperature Ts, and controls an output frequency (to be referred to as an operating frequency hereinafter) of inverter circuit 35 in accordance with the temperature difference (Ta - Ts). More specifically, when the temperature difference is 3° C. or more, the operating frequency is increased up to 100 Hz in units of 10 Hz in accordance with flow 1—1 in FIG. 3A-1. When the temperature difference falls within the range from 2° C. to 3° C., the operating frequency is increased up to 90 Hz in units of 10 Hz in accordance with flow 2-1 in FIG. 3A-1. When the temperature difference falls within the range from 1° C. to 2° C., the operating frequency is increased up to 70 Hz in units of 10 Hz in accordance with flow 3-1 in FIG. 3A-2. When the temperature difference falls within the range from 0° C. to 1° C., the operating frequency is increased up to 50 Hz in units of 10 Hz in accordance with flow 4-1 in FIG. 3B. When the temperature difference is 0° C. or a negative value, i.e., detected temperature Ta is lower than preset temperature Ts, the operating frequency is maintained at 30 Hz in accordance with flow 5-1 in FIG. 3B.

Furthermore, controller 30 controls heater driver 36 in accordance with the temperature difference (Ta - Ts), and causes reheater 27 to be operated with appropriate heating energy. When the reheater is turned on, air which has been cooled and dehumdified by indoor heat exchanger 24 is heated, and is blown into the room as dehumidified air. In this case, when the temperature difference is 3° C. or more, only the cooling operation is continued without turning on reheater 7, as shown in flow 1—1. When the temperature difference falls within the range from 2° C to 3° C., reheater 27 is operated at 200 W according to flow 2-1. When the temperature difference falls within the range from 1° C to 2° C., reheater 27 is operated at 350 W according to flow 3-1. When the temperature difference falls within the range from 0° C. to 1° C., reheater 27 is operated at 500 W according to flow 4-1. When the temperature difference is 0° C. or a negative value, i.e., detected temperature Ta is lower than preset temperature Ts, preheater 27 is operated at 500 W according to flow 5-1.

Therefore, when the temperature difference is 3° C. or more, only the cooling operation is performed by the high-capacity operation of compressor 21. When the temperature difference falls within the range from 2° C. to 3° C., a cooling/drying operation is performed by the intermediate-capacity operation of compressor 21 and the 200 W operation of reheater 27. When the temperature difference falls within the range from 1° C., to 2° C., a cooling/drying operation is performed by the intermediate-capacity operation of compressor 21 and the 350W operation of reheater 27. When the temperature difference falls within the range from 0° C. to 1° C., a low-cooling/drying operation is performed by the low-capacity operation of compressor 21 and the 500 W operation of reheater 27. When the temperature difference is 0° C. or a negative value, i.e., detected temperature Ta is lower than preset temperature Ts, a heating/drying operation is performed by the low-capacity operation of compressor 21 and the 500 W operation of preheater 27 (sensible heat in the cooling operation is compensated by heat generation).

On the other hand, controller 30 calculates a difference between detected humidity Da (absolute humidity) from indoor humidity sensor 33 and preset humidity Ds (absolute humidity set in correspondence with preset temperature Ts and preset relative humidity H), and controls the dehumidification operation or an operation in which the dehumidifying operation is not required, in each of the operation modes corresponding to the temperature differences in accordance with the humidity difference. More specifically, when detected humidity Da is higher than preset humidity Ds, as shown in flows 1—1, 2-1, 3-1, 4-1, and 5-1, the speed of indoor-fan 26 is decreased, and reheater 27 is supplied with an electric power corresponding to a temperature difference. In this case, an amount of air blown by indoor-fan 26 is not decreased below a predetermined lower limit corresponding to an operating frequency of compressor 21. This arrangement prevents freezing due to a decrease in temperature in the indoor heat exchanger. Furthrmore, when detected humidity Da becomes lower than preset humidity Ds, as shown in flows 1-2, 2—2, 3-2, 4-2, and 5-2 of FIGS. 3A-1, 3A-2, and 3B, the speed of indoor-fan 26 is increased, and at the same time, the reheater is turned off. In this cse, the capacity of compressor 21 is set at the lowest capacity (30 Hz) unless a room temperature is high. This is because when room temperature Ta is near preset temperature Ts (3° C.>Ta−Ts), only the cooling capacity is required, and hence compressor 21 can be sufficiently controlled at a low frequency.

Figure 4:
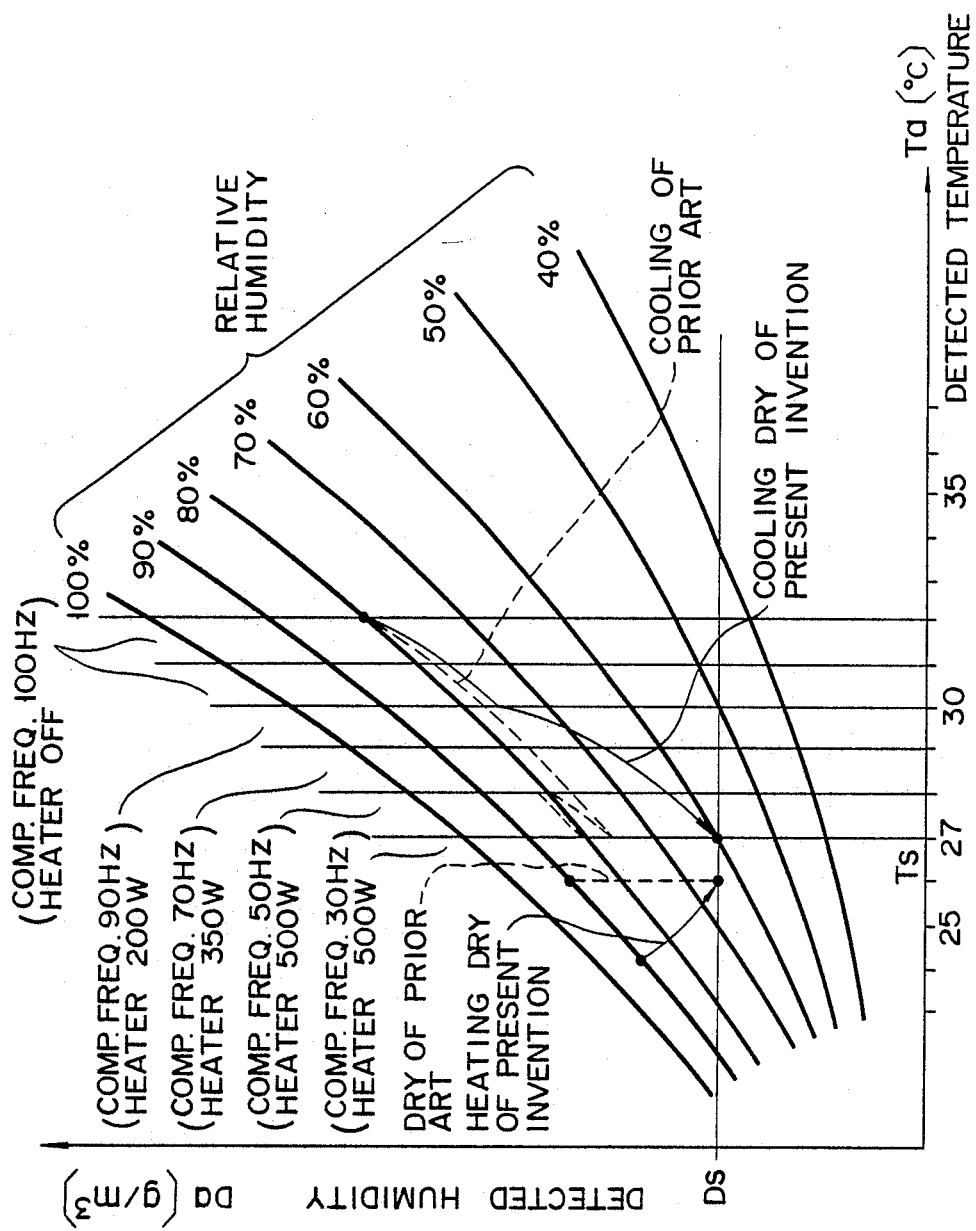
FIG. 4 is a graph showing changes in temperature and humidity according to the embodiment.

Accordingly, as detected temperature Ta approaches preset temperature Ts, the capacity of compressor 21 is decreased (to reduce a decreasing rate of temperature), and the heating energy of reheater 27 is increased. Furthermore, when detected humidity Da reaches preset humidity Ds, reheater 27 is turned off so that the room temperature and the relative humidity can be smoothly and quickly adjusted to the desired states. More specifically, as shown in FIG. 4, in the conventional cooling operation (broken line), the temperature can be decreased, but the relative humidity can be scarcely decreased. Similarly, in the conventional drying operation (broken line), the relative humidity can be decreased, but the temperature remains the same. In contrast to the conventional operations, in the cooling, low-cooling/drying, and heating/drying operation according to the present operation, the temperature and the relative humidity can be smoothly and quickly adjusted to the desired value. For example, an uncomfortable state "temperature: 32° C., relative humidity: 80%" (indicated point A in FIG. 4), as felt in the summer season, can be quickly and smoothly adjusted to a comfortable state (not a sultry state) "temperature: 27° C., relative humidity 60%" indicated by point B in FIG. 4. Accordingly, compared with the conventional method, wherein the humidity is decreased to the desired value after the temperature is decreased to the desired value, the method of the present invention, wherein the temperature and humidity are simultanously decreased to the desired values, can further increase comfort of the user during the operation, while the desired values can be achieved within a short period of time.

Controller 30 detects consumed current I for the entire air conditioner apparatus. If consumed current I reaches a value lower than a predetermined value, e.g., 18 A, which is less than the maximum allowable current in Japan, 20 A, the operating frequency of compressor 21 is decreased in units of 10 Hz. When the operating frequency becomes 30 Hz or less, compressor 21 is turned off, thereby preventing unnecessary operation interruptions by a breaker.

Although in the above embodiment, the heating energy of reheater 27 is changed by thyristor control, for example, a plurality of reheaters may be arranged so that heating energy can be changed by selective operations of the reheaters. In addition, heating energy need not be always changed, because substantially the same effect as that described above can be obtained by turning reheater 27 on and keeping heating energy at 500 W when detected temperature Ta approaches preset temperature Ts.

The present invention is not limited to the particular embodiment described above. Various changes and modifications may be made within the spirit and scope of the invention.

As has been described in detail, according to the present invention, there is provided an air conditioner apparatus capable of quickly and smoothly adjusting the temperature and humidity of a room to constantly optimal conditions and greatly increasing the comfort of the user.

What is claimed is:

1. An air conditioning apparatus comprising:
   a refrigeration cycle including a variable-capacity compressor, an outdoor heat exchanger, an evacuation device, and an indoor heat exchanger, all of which communicate with each other;
   temperature detecting means for detecting an actual indoor temperature;
   humidity detecting means for detecting an actual indoor humidity;
   temperature setting means for setting a desired indoor temperature;
   humidity setting means for setting a desired indoor humidity;
   electric reheater means arranged in association with said indoor heat exchanger for causing said actual indoor humidity to become said desired indoor humidity; and
   control means for:
   outputting first control data for controlling a capacity of said variable-capacity compressor by comparing said desired indoor temperature with said actual indoor temperature and causing a difference therebetween to tend toward zero, said control means including means for calculating the difference between said actual and desired temperatures as a plurality of divided ranges and outputting said first control data for variably controlling said capacity of said variable-capacity compressor in predetermined steps from a predetermined value to a maximum value which varies in accordance with said plurality of divided ranges, and at the same time
   outputting second control data for ON/OFF controlling a heating power of said electric reheater means at a predetermined value by comparing said desired indoor humidity with said actual indoor humidity in units of divided ranges and causing a difference therebetween to tend toward zero, said first and second control data being generated at substantially the same time, thereby quickly and smoothly providing said desired indoor temperature and humidity.

2. An apparatus according to claim 1, wherein the predetermined value varies in accordance with the plurality of divided ranges.

3. An apparatus according to claim 1, wherein said variable-capacity compressor includes a drive motor, and said control means drives an inverter circuit by the first control data to vary a speed of said drive motor with a variable output frequency output from said inverter circuit.

4. An apparatus according to claim 1, wherein said indoor heat exchanger is arranged inside said indoor unit to form an air duct, and said reheater is arranged downstream of said air duct.

5. An apparatus according to claim 1, further comprising:
   a heater driver, said control means controlling said electric reheater means through said heater driver.

6. An air conditioner apparatus comprising:
   a refrigeration cycle including a variable-capacity compressor, an outdoor heat exchanger, an evacuation device, and an indoor heat exchanger, all of which communicate with each other;
   humidity setting means for setting a desired indoor humidity;
   temperature setting means for setting a desired indoor temperature;
   temperature detecting means for detecting an actual indoor temperature;
   humidity detecting means for detecting an actual indoor humidity;
   electric reheater means arranged in associated with said indoor heat exchanger for causing said actual indoor humidity to become said desired indoor humidity;
   control means for:
   outputting first control data for controlling a capacity of said variable-capacity compressor by comparing said desired indoor temperature with said actual indoor temperature and causing a difference therebetween to tend toward zero, said control means including means for calculating the difference between said actual and desired temperatures as a plurality of divided ranges and outputting said first control data for variably controlling said capacity of said variable-capacity compressor in predetermined steps from a predetermined value to a maximum value which varies in accordance with said plurality of divided ranges, and at the same time outputting second control data for controlling a heating power of said electric reheater means by comparing said actual indoor humidity with said desired indoor humidity and causing a difference therebetween to tend toward zero, said first and second control data being generated at substantially the same time, thereby quickly and smoothly providing said desired indoor temperature and humidity;

wherein said plurality of divided ranges includes a first range in which a difference between both temperature data is not more than 0° C., a second range of a difference between 0° C. and a first predetermined temperature, a third range of a difference between said first predetermined temperature and a second predetermined temperature, a fourth range of a difference between said second predetermined temperature and a third predetermined temperature, and a fifth range of a difference between said third predetermined temperature and a fourth predetermined temperature, the maximum value which varies in accordance with said plurality of divided ranges is successively increased from said first range to said fifth range; and wherein said control means detects said difference between both humidity data in said first to fifth ranges, respectively, and outputs said second control data for ON/OFF-controlling said electric reheater means with said heating power which is successively decreased from said first range to said fourth range in accordance with the detected result.

7. An apparatus according to claim 6, wherein said heating power in said first range is equal to that of said second range.

8. An air conditioner apparatus comprising:
a refrigeration cycle including a variable-capacity compressor, an outdoor heat exchanger, an evacuation device, and an indoor heat exchanger, all of which communicate with each other;
temperature setting means for setting a desired indoor temperature
humidity setting means for setting a desired indoor humidity;
temperature detecting means for detecting an actual indoor temperature;
humidity detecting means for detecting an actual indoor humidity;
electric reheater means arranged in association with said indoor heat exchanger for causing said actual indoor humidity to become said desired indoor humidity;
control means for:
outputting first control data for controlling a capacity of said variable-capacity compressor by comparing said desired indoor temperature with said actual indoor temperature and causing a difference therebetween to tend toward zero, and at the same time outputting second control data for controlling a heating power of said electric reheater means by comparing said desired indoor humidity with said actual indoor humidity and causing a difference therebetween to tend toward zero, said first and second control data being generated at substantially the same time, thereby quickly and smoothly providing said desired indoor temperature and humidity; and an indoor-fan arranged in association with said indoor heat exchanger, said control means outputting third control data for decreasing and increasing a speed of said indoor-fan in accordance with the difference between both humidity data.

9. An air conditioning apparatus comprising:
a refrigeration cycle including a variable-capacity compressor, an outdoor heat exchanger, an evacuation device, and an indoor heat exchanger, all of which communicate with each other;
temperature setting means for setting a desired indoor temperature;
humidity setting means for setting a desired indoor humidity;
temperature detecting means for detecting an actual indoor temperature;
humidity detecting means for detecting an actual indoor humidity;
electric reheater means arranged in association with said indoor heat exchanger for causing said actual indoor humidity to become said desired indoor humidity; and
control means for;
outputting first control data for controlling a capacity of said variable-capacity compressor by comparing said desired indoor temperature with said actual temperature and causing a difference therebetween to tend toward zero,
ouputting second control data for controlling a heating power of said electric reheater mean by comparing said desired indoor humidity with said actual indoor humidity and causing a difference therebetween to tend toward zero, said first and second control data being generated and output at substantially the same time, thereby quickly and smoothly providing said desired indoor temperature and humidity,
detecting a consumed current in said air conditioner apparatus, and
outputting third control data for controlling said capacity of said variable-capacity compressor by lowering said capacity when said consumed current exceeds a reference value.

10. An apparatus according to claim 9, wherein said third control data lower said capacity of said variable-capacity compressor at predetermined steps.

11. An apparatus according to claim 9, wherein said third control data include data for stopping said variable-capacity compressor when said capacity of said variable-capacity compressor is lower than a predetermined value.

* * * * *